Patented Apr. 23, 1940

2,198,583

UNITED STATES PATENT OFFICE 2,198,583

ETHER ESTERS OF NUCLEAR SUBSTITUTED SALICYLIC ACIDS

Ernest F. Grether and Russell B. Du Vall, Midland, Mich., assignors to The Dow Chemical Company, Midland, Mich., a corporation of Michigan No Drawing. Application January 28, 1938, Serial No. 187,556

2 Claims. (Cl. 260—474)

This invention concerns certain new ether esters of nuclear substituted salicylic acids, having the general formula:

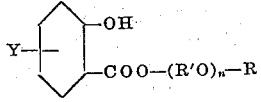

wherein R' represents an alkylene radical containing at least 2 carbon atoms, $n$ is an integer, R represents alkyl, aryl, or substituted aryl, and Y represents alkyl, aryl, alkoxy, or halogen.

The new compounds herein disclosed are useful as plasticizers in nitro-cellulose, cellulose acetate, and cellulose ether, e. g., ethyl-cellulose, compositions. They are compatible with such cellulose derivatives, are substantially non-volatile at room temperatures, are soluble or miscible in the usual solvents or solvent mixtures employed for dissolving cellulose derivatives, and do not readily decompose or discolor. Cellulose derivative compositions plasticized with our new compounds are suitable for use in the preparation of artificial leather, lacquers, Celluloid, films, various molded objects, etc.

The ether esters of substituted salicylic acids may be prepared by esterifying a nuclear substituted salicylic acid, such as 3-phenyl-salicylic acid, 5-brom-salicylic acid, etc., with a mono-ether of a glycol, e. g., ethylene glycol, diethylene glycol, propylene glycol, etc. The esterification is usually carried out by heating a mixture of the substituted salicylic acid with preferably more than its molecular equivalent of the glycol mono-ether and a small proportion, e. g., 0.02 to 0.06 molecular equivalents, of a strong acid, such as sulphuric or benzene sulphonic acid, to a temperature above 100° C., preferably between 120° and 150° C. Water formed by the reaction is preferably distilled from the mixture as it is formed. If desired, a water-immiscible organic solvent such as benzene or toluene may be added for the purpose of promoting the distillation of water from the reaction mixture. The esterification is usually complete after from five to ten hours heating, although longer heating may sometimes be required. The reacted mixture is treated with sufficient alkali to neutralize the acid contained therein, after which the ester product is separated by fractional distillation under vacuum.

The following examples illustrate a number of ways in which the principle of the invention may be employed but are not to be construed as limiting the same.

Example 1

A mixture of 194 grams (0.89 mol) of 5-brom-salicylic acid, 146 grams (1.62 mols) of ethylene glycol monoethyl ether, and 3.0 grams of benzene sulphonic acid was heated at 145°–150° C. for 10¾ hours in a flask fitted with a dropping funnel, condenser and receiver. During the last 4½ hours of heating, benzene was added dropwise to facilitate the distillation of water from the reaction mixture. The reacted mixture was dissolved in benzene and washed with dilute aqueous sodium carbonate. Benzene was removed by distillation under vacuum after which the product was dissolved in ethyl alcohol from which it crystallized. There was obtained the beta-ethoxy ethyl ester of 5-brom-salicylic acid, a white, crystalline solid melting at 62° C. and having the formula:

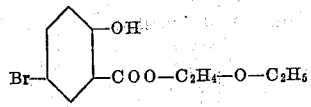

Example 2

A mixture of 187 grams (1.22 mols) of o-cresotinic acid, 225 grams (2.5 mols) of ethylene glycol-mono-ethyl ether, and 8.0 grams of benzene sulphonic acid was heated at 140°–160° C. for 12½ hours as in Example 1. Benzene was added dropwise during the reaction to facilitate the removal of water. The reacted mixture was dissolved in benzene, washed with aqueous sodium carbonate and dried over calcium chloride. Benzene was distilled off under vacuum and the product was purified by fractional distillation. There was obtained the beta-ethoxy-ethyl ester of 3-methyl-salicylic acid, a colorless and odorless liquid boiling at 128°–129° C. under 2 millimeters pressure, having a specific gravity of 1.102 at 20/20° C. and having the index of refraction, $$n_D^{20} = 1.5129$$

The product has the formula:

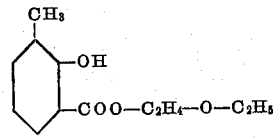

Example 3

A mixture of 120 grams (0.56 mol) of 3-phenyl-salicylic acid, 100 grams (0.85 mol) of ethylene glycol-mono-butyl ether and 3 grams of benzene sulphonic acid was heated at 150°–165° C.

for 13½ hours during which time benzene was added dropwise to facilitate the removal of water. The reacted mixture was dissolved in benzene, washed with aqueous sodium carbonate, and dried over calcium chloride, and the product recovered by fractional distillation. There was obtained the beta-butoxy-ethyl ester of 3-phenyl-salicylic acid, a pale yellow liquid distilling with decomposition at 214°–218° C. under 2 millimeters pressure, having a specific gravity of 1.109 at 20/20° C. and an index of refraction, $$n_D^{20} = 1.5607$$

The product has the formula:

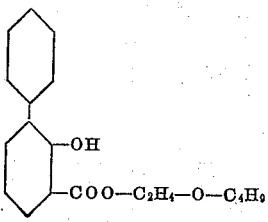

Example 4

A mixture of 54 grams (0.28 mol) of 4-propoxy-salicylic acid, 100 grams (0.85 mol) of ethylene glycol-mono-butyl ether, and 1 gram of benzene sulphonic acid was heated at 150°–165° C. for 14½ hours, during which time benzene was added dropwise to facilitate the removal of water. The reacted mixture was dissolved in benzene, washed, dried, and distilled as in Example 1. There was obtained the beta-butoxy-ethyl ester of 4-propoxy-salicylic acid, a colorless, mobile liquid distilling at 110°–115° C. under 2 millimeters pressure, having a specific gravity of 1.0467 at 20/4° C., and an index of refraction, $$n_D^{20} = 1.5172$$

The product has the formula:

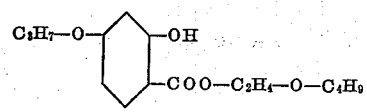

Other ether esters of nuclear substituted salicylic acids may be prepared by esterifying the substituted salicylic acid with a glycol-mono-ether in accordance with the procedure hereinbefore described. For example, 4-methyl-salicylic acid may be reacted with the mono-phenyl ether of ethylene glycol to produce the beta-phenoxy-ethyl ester of 4-methyl-salicylic acid; 3-ethoxy-salicylic acid may be reacted with the mono-isopropyl ether of trimethylene glycol to produce the gamma-isopropoxy-propyl ester of 3-ethoxy-salicylic acid; 5-chlor-salicylic acid may be reacted with the 2-chloro-phenoxy-ether of ethylene glycol to produce the beta-2-chloro-phenoxy-ethyl ester of 5-chlor-salicylic acid; 4-hexyl-salicylic acid may be reacted with the ethyl ether of triethylene glycol to produce the omega-ethoxy-triethylene glycol ester of 4-hexyl-salicylic acid; 3-butyl-salicylic acid may be reacted with the mono-o-xenyl ether of ethylene glycol to produce the beta-o-xenoxy-ethyl ester of 3-butyl-salicylic acid; etc. All such products are suited to the uses hereinbefore mentioned.

Other modes of applying the principle of our invention may be employed change being made as regards the materials employed, provided the products stated by any of the following claims or the equivalent of such stated products be obtained.

We therefore particularly point out and distinctly claim as our invention:

1. A glycol ether ester of a phenyl-substituted salicylic acid having the general formula

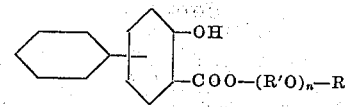

wherein R' represents a lower alkylene radical containing at least two carbon atoms, n is an integer, and R represents a radical selected from the class consisting of alkyl and aryl radicals.

2. The beta-butoxy-ethyl ester of 3-phenyl-salicylic acid, a liquid distilling at approximately 214–218° C. under 2 millimeters pressure, having a specific gravity of approximately 1.109 at 20° C. and having the formula:

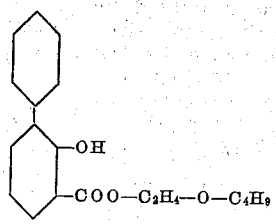

ERNEST F. GRETHER.
RUSSELL B. DU VALL.